US005330389A

United States Patent [19]
Jost et al.

[11] Patent Number: 5,330,389
[45] Date of Patent: Jul. 19, 1994

[54] ROLLER AND TRACK CONFIGURATION FOR A TRIPOD JOINT

[75] Inventors: Dieter Jost, Troisdorf; Werner Krude, Neunkirchen-Wolperath, both of Fed. Rep. of Germany

[73] Assignee: GKN Automotive AG, Siegburg, Fed. Rep. of Germany

[21] Appl. No.: 786,702

[22] Filed: Nov. 1, 1991

[30] Foreign Application Priority Data

Nov. 2, 1990 [DE] Fed. Rep. of Germany ....... 4034758

[51] Int. Cl.⁵ ............................................. F16D 3/26
[52] U.S. Cl. .................................... 464/111; 464/905
[58] Field of Search .............. 464/111, 123, 124, 132, 464/905

[56] References Cited

U.S. PATENT DOCUMENTS

| | | | |
|---|---|---|---|
| 3,490,251 | 1/1970 | Roethlisberger | 464/124 |
| 3,613,396 | 10/1971 | Drevard et al. | 464/111 |
| 4,192,154 | 3/1980 | Nakamura et al. | 464/132 X |
| 4,379,706 | 4/1983 | Otsuka et al. | 464/124 X |
| 4,484,900 | 11/1984 | Orain | 464/111 |
| 4,571,214 | 2/1986 | Orain | 464/111 |
| 4,589,856 | 5/1986 | Mazziotti et al. | 464/111 |
| 4,747,803 | 5/1988 | Kimato et al. | 464/111 |
| 5,098,342 | 3/1992 | Mizukoshi | 464/111 |

FOREIGN PATENT DOCUMENTS

| | | |
|---|---|---|
| 0297298 | 4/1989 | European Pat. Off. |
| 441382 | 8/1991 | European Pat. Off. ............ 464/111 |
| 2620527 | 1/1977 | Fed. Rep. of Germany . |
| 2831044 | 9/1983 | Fed. Rep. of Germany . |
| 3523838 | 1/1986 | Fed. Rep. of Germany . |
| 3814605 | 11/1988 | Fed. Rep. of Germany . |
| 3716962 | 5/1989 | Fed. Rep. of Germany . |
| 4110311 | 10/1991 | Fed. Rep. of Germany ...... 464/111 |
| 5940016 | 3/1984 | Japan . |
| 2226102 | 6/1990 | United Kingdom . |
| 2237618 | 5/1991 | United Kingdom ................ 464/111 |
| 9006451 | 6/1990 | World Int. Prop. O. . |

Primary Examiner—Daniel P. Stodola
Assistant Examiner—Eileen A. Dunn
Attorney, Agent, or Firm—Harness, Dickey & Pierce

[57] ABSTRACT

A tripod joint has an outer joint part (1, 41, 61) with three circumferentially distributed longitudinal recesses (2, 42, 62) each forming circumferentially opposed tracks (4, 5; 45, 65). An inner joint part (7, 47, 67) with tripod arms (9, 49, 69) which extend into the longitudinal recess (2, 42, 62) is positioned within the outer joint part (1, 41, 61). Rolling members (10, 50, 70) in rolling contact with the tracks (4, 5; 45, 65) are supported and movably and pivotably held on the tripod arms (9, 49, 69). The longitudinal recesses (2, 42, 62) include guiding means (18, 19) holding the rolling members (10, 50, 70) in the longitudinal recesses (2, 42, 62) so as to be axis-parallel with the joint. The rolling member (10, 50, 70) are in contact with one of the tracks (4, 5,; 45; 65). In each case, there is provided a first contact point (C) for accommodating a circumferentially extending transmission force $F_R$ in the region of a central roller plane (E) and at least one second contact point (A) for accommodating an inwardly directed guiding force $F_F$ in the region of a radially inner supporting shoulder (19).

16 Claims, 7 Drawing Sheets

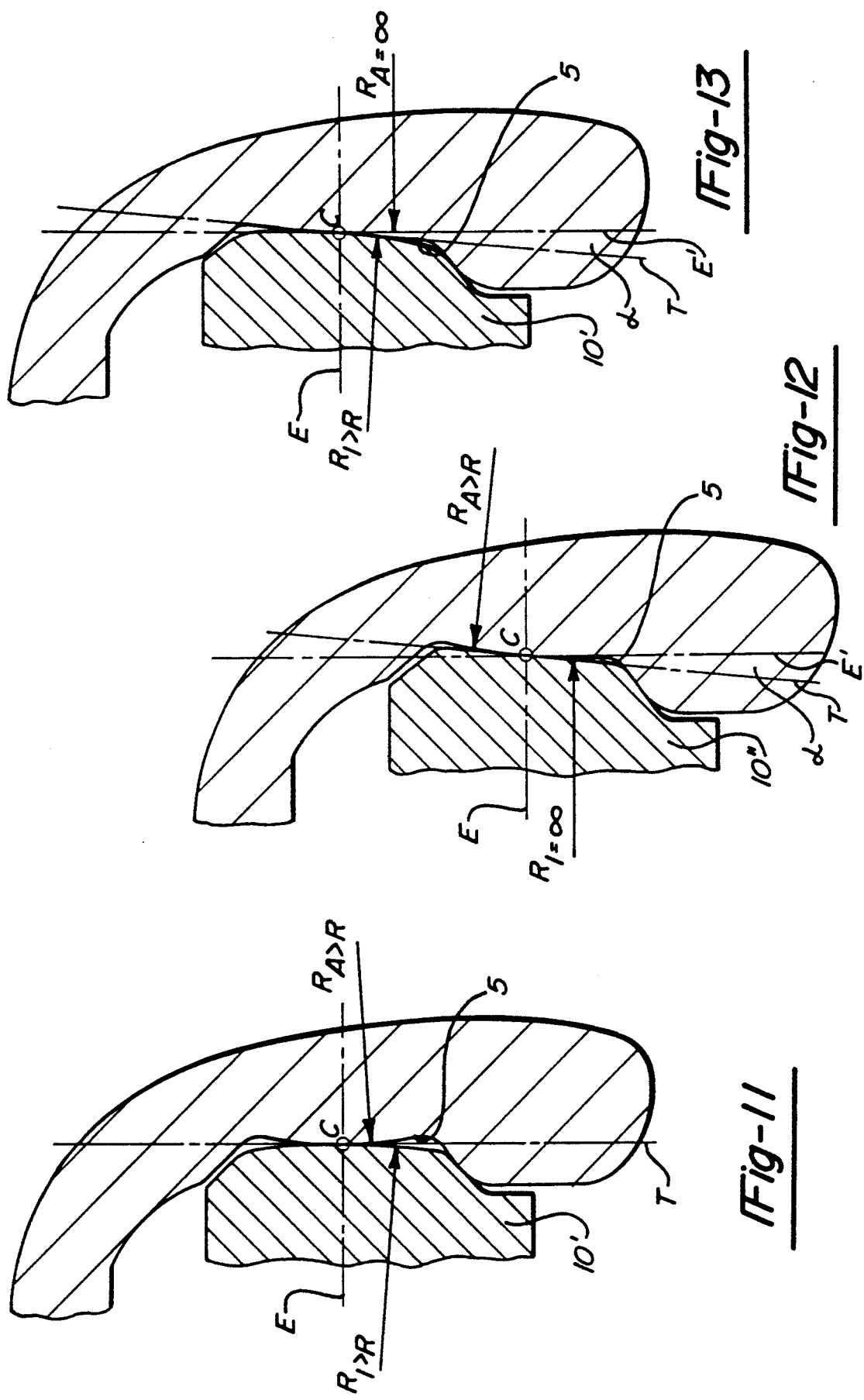

ROLLER AND TRACK CONFIGURATION FOR A TRIPOD JOINT

BACKGROUND AND SUMMARY OF THE INVENTION

The invention relates to tripod joints. The joints include an outer joint part, with three circumferentially distributed longitudinal recesses each forming circumferentially opposed tracks, and an inner joint part, with tripod arms which extend into the longitudinal recess and support rolling members movably and pivotably held on the tripod arms in rolling contact with the tracks. The longitudinal recesses are provided with guiding means to hold the rolling members in the longitudinal recesses so as to be axis-parallel with the inner joint part.

Examples of tripod joints are DE 39 36 601, DE 28 31 044 or DE 37 16 962 C 2. Although these designs solve the problem of a free rolling movement of the rolling members in the tracks under rotation and articulation conditions, the shape of the rolling members during the radially inwardly directed movement of the arms may cause the rolling members to jam between the shoulders at the longitudinal recesses which prevent the rolling members from rolling freely. Attempts have been made to provide intermediate members not participating in the rolling movement. An example of intermediate members are collars arranged at the roller carrier, which collars accommodate the radial forces, thereby preventing the rollers from jamming. As a result, the roller assembly needs to consist of a plurality of parts and becomes expensive. Functional advantages are achieved at considerable additional costs.

It is the object of the present invention to provide a tripod joint which eliminates roller jamming in the tracks caused by the radial movement component of the arms relative to the rollers when the joint rotates in an articulated condition.

The objective is achieved by providing a first contact point for accommodating a circumferentially extending transmission force in the region of a central roller plane and at least one second contact point for accommodating an inwardly directed guiding force in the region of a radially inner supporting shoulder. The central plane of the roller is the plane containing the first contact point relative to the track when the joint is in an extended condition and extending perpendicularly relative to the arm axis. In most cases, the plane is also the geometric axis of symmetry and height-bisecting plane of the roller region coming into contact with the track.

In accordance with the objective of the invention, this measure ensures that the first contact point for torque transmission is substantially constant from the point of view of position and direction. The transmission forces do not influence the radial guiding forces for the rollers, which are accommodated in a second contact point. A tangential plane on the surfaces of the first contact point extends either parallel to the arm axis or it opens outwardly at an angle relative to the arm axis, with an outwardly directed reaction force acting at the first contact point on the roller becoming effective in the latter case. The constancy of the position of the contact point is ensured by large curved surfaces of the track and/or the rolling member. The large-area curvature of the surface includes an infinite radius of curvature. In the region of the first contact point the rolling member may be cylindrical or spherical and the track surface may be planar, with the counter-face in the cross-section through the joint comprising a curvature with a large radius. It is also possible for both surfaces in the cross-section through the joint to be curved. However, it is preferable, in each case, to select radii of curvature which are clearly greater than the greatest rolling radius of the rolling member itself. The second contact point accommodating the guiding forces is positioned radially inside the first contact point, with the tangential plane on the surface in this contact point in the region of the guiding shoulders inclined by approximately 45° relative to the arm axis. A third contact point symmetrical relative to the first contact point may be provided radially outside, at a further guiding shoulder of the track. It is proposed that the roller should be able to move with radial play between the first and third contact points. The functioning of the third contact point may also be ensured by simple contact of the rolling member or parts related thereto with the base of the longitudinal recess itself.

The subject of the invention is generally applicable to joints in which the head of the arm element slides pivotably and radially movably in an internally cylindrical roller and bearing carrier; to joints with a two-part roller and bearing carrier comprising inner and outer rings pivotable relative to each other, the inner ring being radially movable on a cylindrical arm; and to joints which the internally cylindrical face of the rolling member slides on an externally spherical face of an inner ring so as to be pivotable and radially movable, the inner ring being rotatably supported on a cylindrical arm.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 11 is a partial section view of a fourth embodiment of a roller in a recess in accordance with the invention.

FIG. 12 is a partial section view of a fifth embodiment of a roller in a recess in accordance with the invention.

FIG. 13 is a partial section view of a sixth embodiment of a roller in a recess in accordance with the invention.

DETAILED DESCRIPTION OF THE PREFERRED EMBODIMENTS

Figure 1:
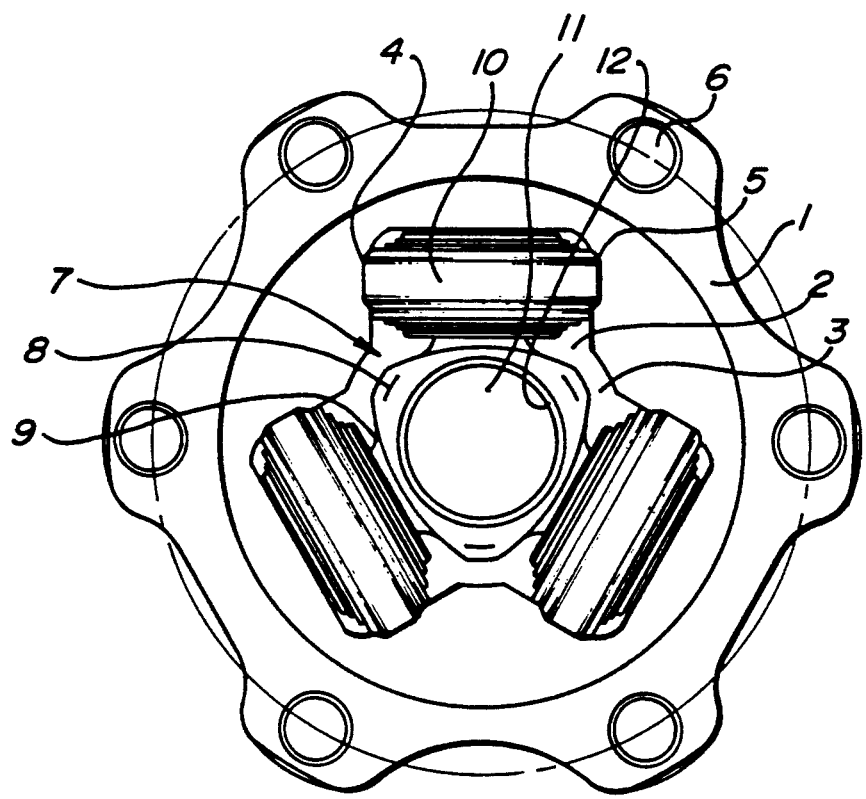
FIG. 1 is an axial end view of a tripod joint in accordance with the invention.

FIG. 1 illustrates a tripod joint with an outer joint part 1 having three circumferentially distributed longitudinal recesses 2. The longitudinal recesses 2 radiate from a central inner recess 3 and each form circumferentially opposed tracks 4 and 5 which will be described in more detail later. The outer joint part also includes bolt holes 6.

Inside the outer joint part 1 is an inner joint part 7. The inner joint part 7 includes a central parts and arms 9 extending therefrom. Rolling members 10 are held on the arms 9 by assemblies. The central part 8 includes an inner aperture 11 with inner teeth 12 to receive a driveshaft.

Figure 2:
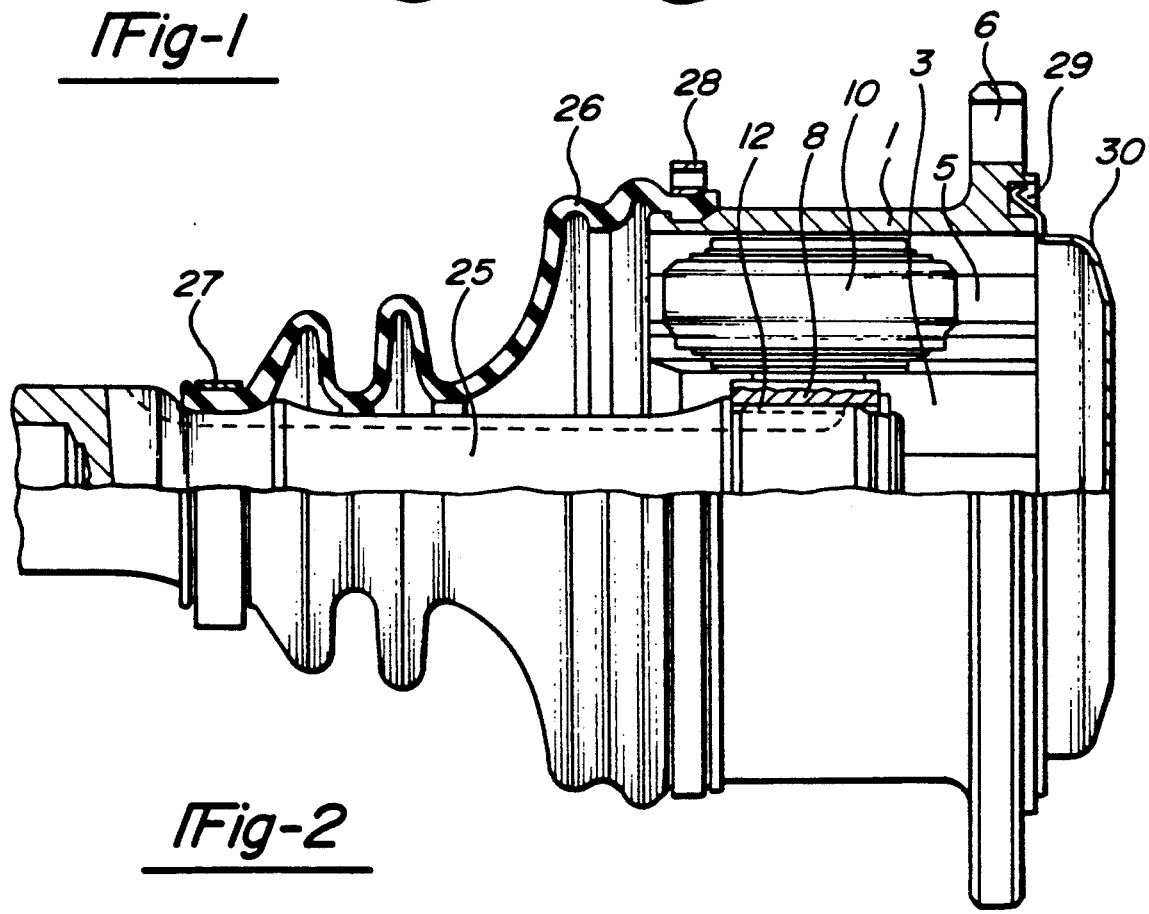
FIG. 2 is a longitudinal view partially in section of a tripod joint of FIG. 1.

FIG. 2 shows a complete version of the joint according to FIG. 1, corresponding details having been given the same reference numbers. The longitudinal section shows only one of the roller assemblies 10. A shaft journal 25 is inserted into the central part 8 of the inner joint part 7. A convoluted boot 26 is secured to the shaft by a first tensioning strip 27 and to the outer joint part by a second tensioning strip 28. The boot seals the outer joint part 1 relative to the said shaft journal. Furthermore, the opposite end of the outer joint part is closed by a cover 30 inserted into a circumferential groove 29.

Figure 3:
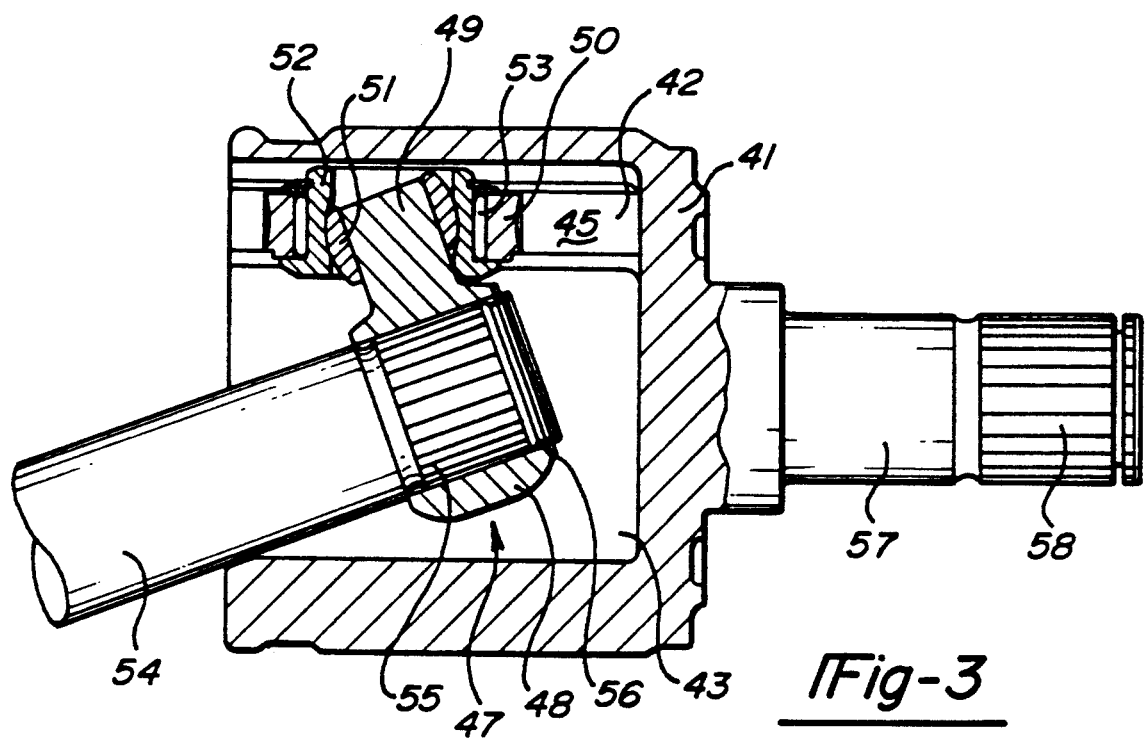
FIG. 3 is a longitudinal section view of a second embodiment of a tripod joint in accordance with the invention.

FIG. 3 illustrates a Joint whose roller assembly is different from that shown in FIG. 1. FIG. 3 illustrates the outer joint part 41 with a section through one of the three longitudinal recesses 42 and a plan view of one of the tracks 45, as well as the inner joint part 47 with a central part 48 and an arm 49. The arm 49 indirectly holds a rolling member 50. In this case, the arm 49 is designed to be cylindrical with an internally cylindrical and externally spherical annular sleeve 51 radially sliding thereon. The sleeve 51 engages an internally spherical face of an outer ring or bearing carrier 52. The bearing carrier 52 holds needle bearings 53, which the outer roller 50 rolls directly thereon. A shaft journal 54 is inserted into the central part 48 of the inner joint part 47. Both parts engage each other via splines 55. A securing ring 56 is used for axial fixing purposes. The outer joint part 41 is integrally connected to the shaft journal 57 which is also provided with splines 58.

Figure 4:
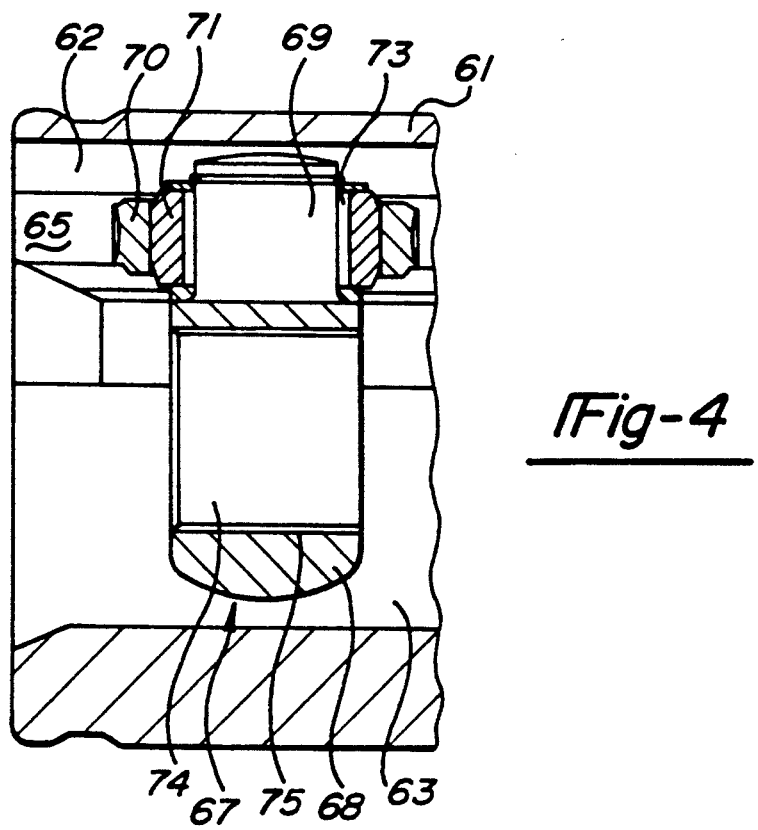
FIG. 4 is a partial longitudinal section view of a third embodiment of a tripod joint in accordance with the invention.

FIG. 4 shows a portion of a joint with a modified roller assembly design. The outer Joint part 61 is illustrated without base and subsequent arms and with the inner recess 74 with the splines 75 not containing a shaft journal. Otherwise, the joint interior 63 and one of the longitudinal recesses 62 with one of the tracks. 65 are identifiable. The inner joint part 67 with the central part 68 is again shown in section with a cylindrical arm 69 which directly carries a needle bearing 73, with an internally cylindrical, externally spherical roller 71 running thereon. The roller 71 is pivotably and radially movably guided in a rolling member 70.

Figure 5:
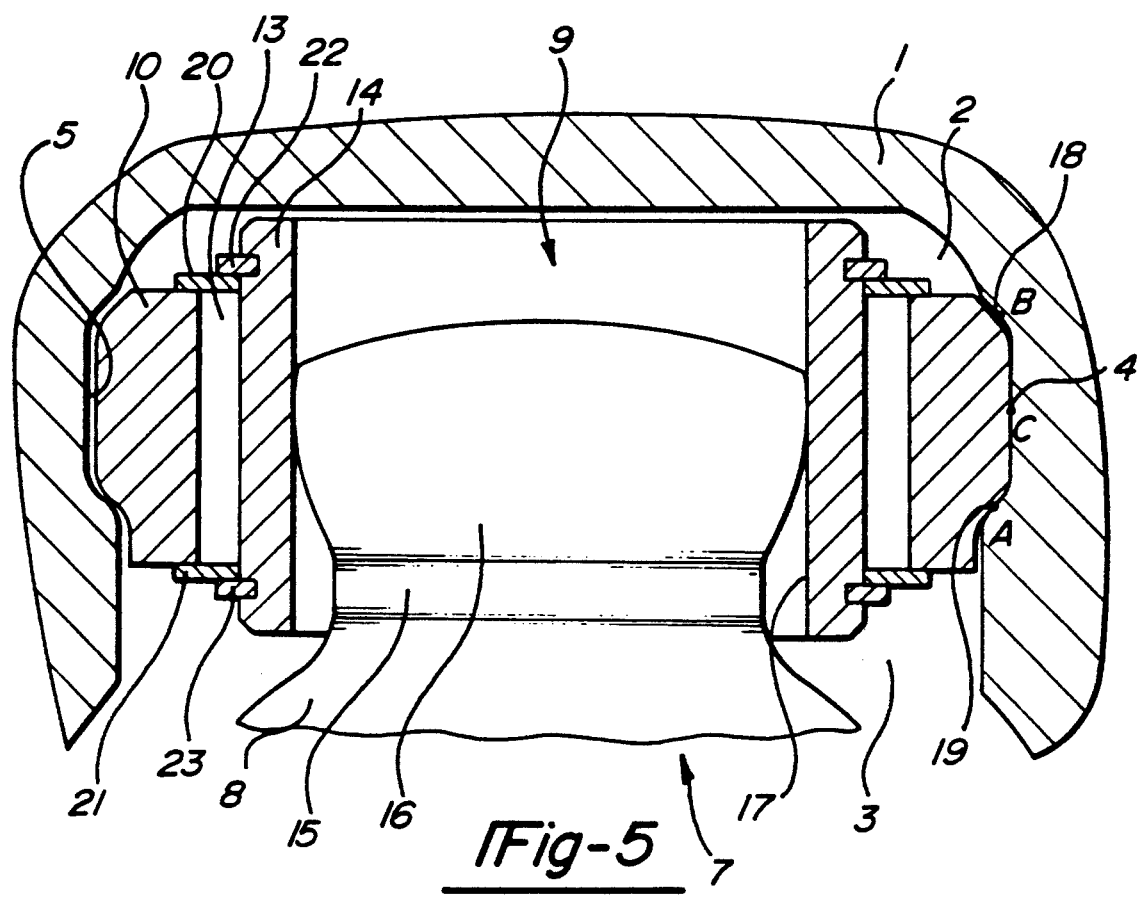
FIG. 5 is a sectional view of a roller assembly in accordance with the invention as illustrated in FIGS. 1 and 2.
Figure 6:
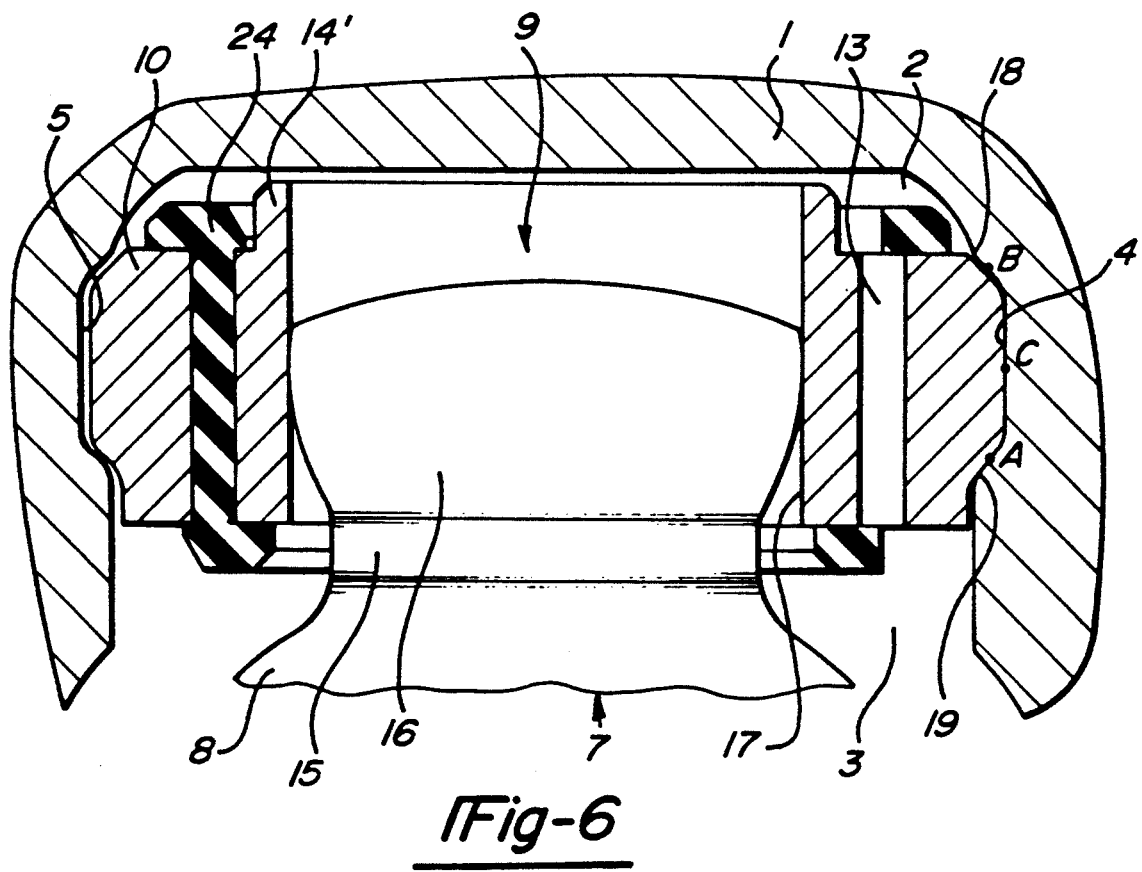
FIG. 6 is a sectional view like FIG. 5 of a second embodiment of a roller assembly in accordance with the invention.
Figure 7:
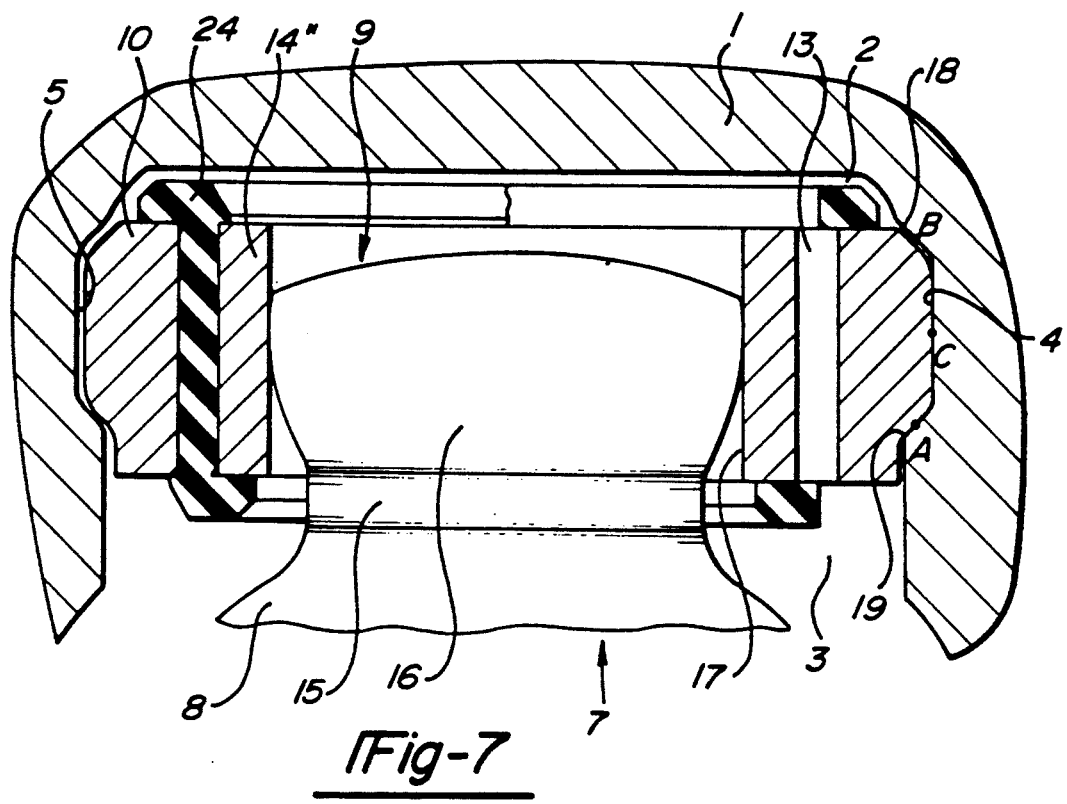
FIG. 7 is a sectional view like FIG. 5 of a third embodiment of a roller assembly in accordance with the invention.

FIGS. 5 to 7 each show a cross-section of part of an outer joint part 1 with a longitudinal recess 2 which passes into the inner recess 3. The longitudinal recess forms tracks 4 and 5 whose shape has yet to be described in greater detail. As illustrated, the rolling members 10 run or roll in the tracks under torque load while contacting one of the two tracks. The rolling members 10 are rotatably held on a roller carrier 14 via a rolling contact bearing 13. An arm 9 at the central part 8 of the inner joint part 7 engages the roller carrier. The arm 9 includes a tapered neck 15 and a part-spherical head 16 which radially movably and pivotably slides in an internally cylindrical surface 17 of the roller carrier 14. It can be seen that the tracks 4 and 5, together with the rolling member 10, each form a first contact point C which is positioned in one plane with the contact line between the head 16 of the arm element and the inner face 17. It can also be seen that the tracks 4 and 5, in addition, form shoulders 18 and 19 which, in second and third contact points A, B, alternately support the rolling member 10 when it is subjected to radial loads generated by arm sliding forces.

In FIG. 5, the rolling contact bearing is designed as a needle bearing and the rolling member 10 is held by simple discs 20 and 21 and securing rings 22 and 23 secured in the roller carrier 14. The roller carrier 14 is extended radially outwardly so that, optionally, depending on the radial play relative to the outer joint part, it may also assume the function of the third contact point B. That is, it may support the rolling member radially outwardly.

In FIG. 6, the rolling member 10 and the rolling contact bearing 13 are designed as a needle bearing held on the rolling member 14' by a cage element 24. At the same time, the cage element 24 assumes the function of holding and guiding the bearing needles.

FIG. 7 shows the rolling member 10 being held relative to the roller carrier 14" by a cage element 24 as shown in FIG. 6. However, the roller carrier 14" is radially shortened so that, optionally, depending on the radial play relative to the outer joint part, it may assume the function of the third contact point B. That is, it may support the rolling member radially outwardly by the cage element 24.

FIGS. 8 to 14 each show a section or a half section view through part of the outer joint part 1, a longitudinal recess 2 and a rolling member 10. It can be seen that there are differences between the cross-sectional shapes of the rollers and tracks. The design of the roller retention assembly is insignificant. The roller 10 could be held on the inner joint part in the same way as the roller 50 is held in FIG. 3 or the roller 70 in FIG. 4.

Figure 8:
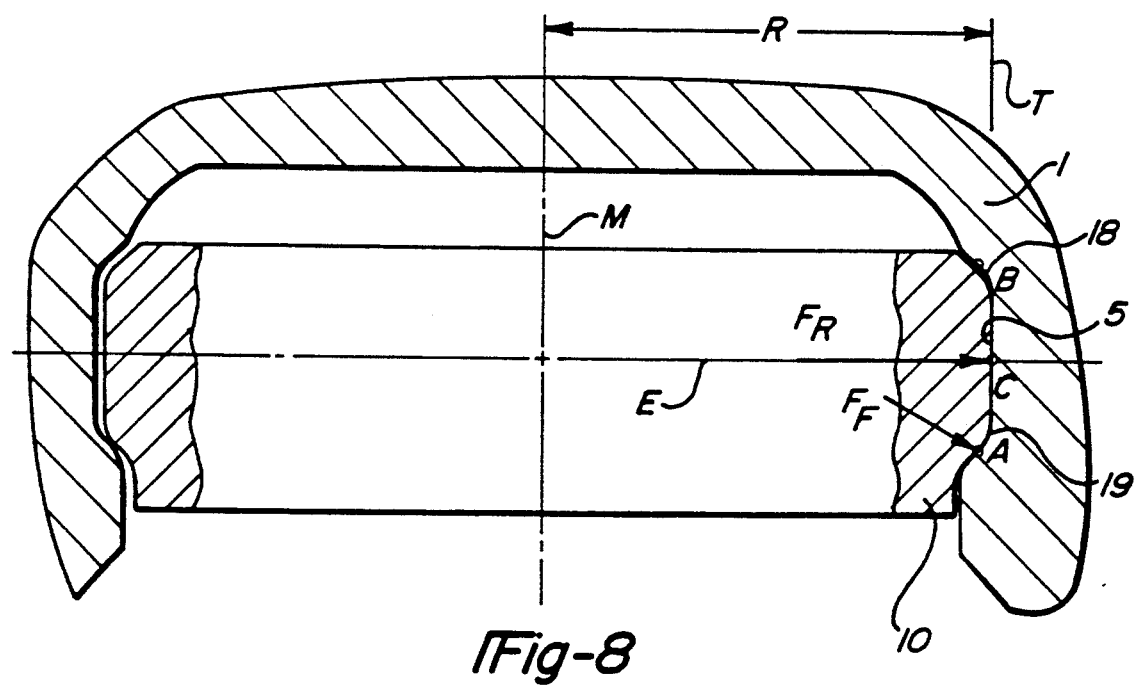
FIG. 8 is a cross-section view of a roller in a longitudinal recess.

FIG. 8 illustrates symbolically that under torque load, the main transmission force $F_R$, between the rolling member 10 and the track 5, occurs in one single contact point C positioned approximately in the central roller plane E. At a second contact point A, a lower guiding force $F_F$ is transmitted independently of torque and thus independently of the force $F_R$ at a lower shoulder 19 in the track 5. Preferably, the force $F_R$ is exerted at an angle of approximately 45° relative to the force $F_F$. The force $F_F$ results from the movement of the respective arm in the roller and from the radial force caused by the arm movement and changes as a function of its angular position. During the counter movement, at the third contact point B at the shoulder 18, there may occur a guiding force symmetrical thereto with reference to the central roller plane E. The movement of the arm relative to the roller and the track shapes described below in greater detail change the position of the first contact point C only slightly. The rolling radius of the roller 10 referred to in the following Figures is given the reference symbol R.

Figure 9:
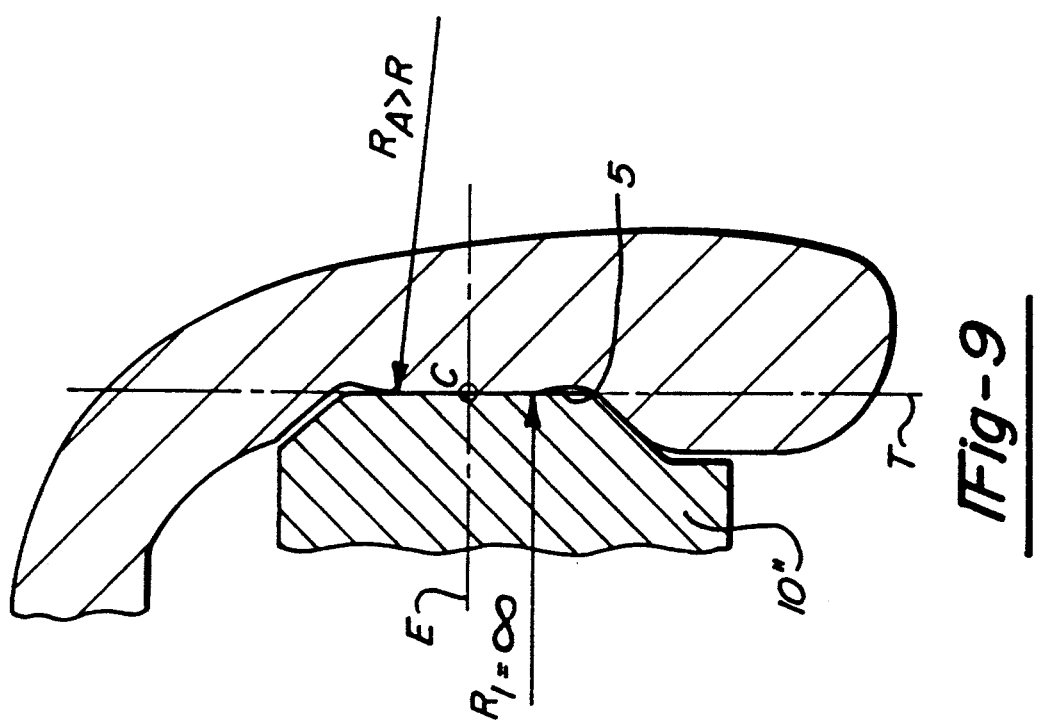
FIG. 9 is a partial section view of a second embodiment of a roller in a recess in accordance with the invention.

In FIG. 9, the cross-section of the track 5 is designed to be convex. The track 5 includes a cylindrical surface whose radius of curvature $R_A$ is greater than the rolling radius R of the rolling member 10. The radius of curvature $R_I$ of the rolling member 10 itself is infinite if viewed in cross-section, i.e. the roller includes a cylindrical track shape in the region of the first contact point C. The tangential plane T at first contact point C is positioned perpendicularly to the central roller plane E. The details of FIG. 9 correspond to those of FIG. 8.

Figure 10:
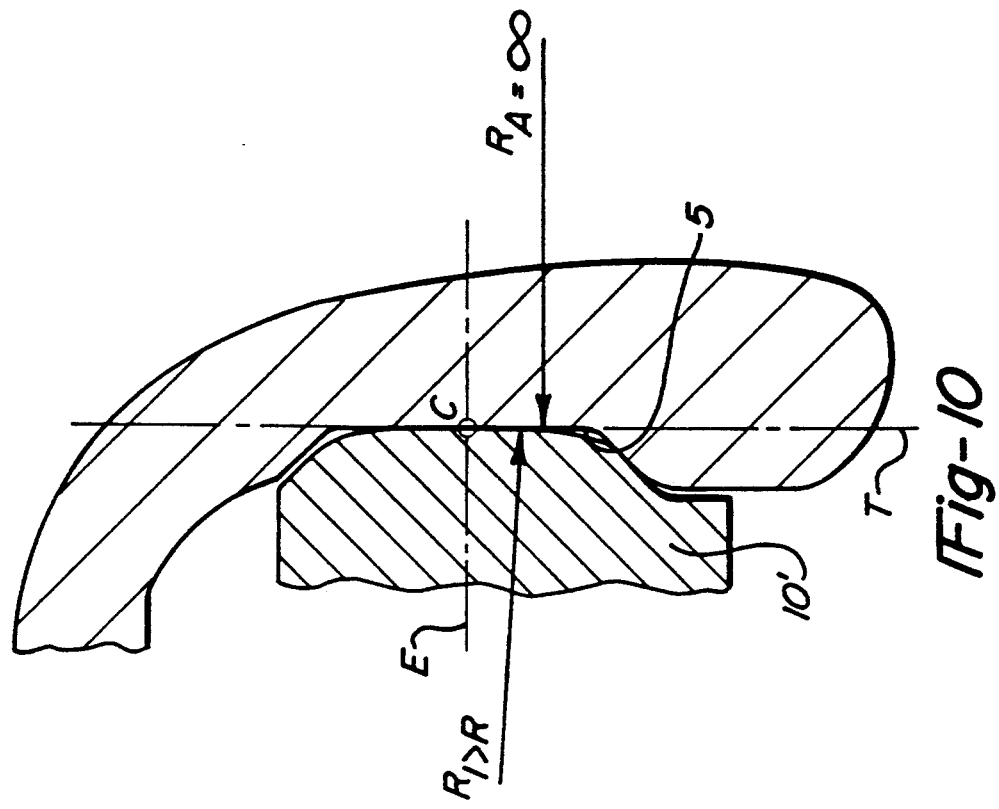
FIG. 10 is a partial section view of a third embodiment of a roller in a recess in accordance with the invention.

In FIG. 10, the radius of curvature $R_A$ of the track 5 in the region of the first contact point C is infinite if viewed in cross-section. The track is planar, whereas the roller 10, if viewed in cross-section, has a spherical track shape whose radius of curvature $R_I$ is larger than the rolling radius R of the rolling member 10. The tangential plane T in contact point C is positioned perpendicularly on the central roller plane E.

In the cross-section as shown in FIG. 11, both the track 5, in the region of the contact point C, and the rolling member 10 are convex. Both radii of curvature, radius $R_A$ of the track and radius $R_I$ of the rolling member, are greater than the rolling radius $R_1$ of the rolling member 10 shown in FIG. 8. In this Figure, the tangential plane T at first contact point c is positioned perpendicularly on the central roller plane E.

In FIG. 12, analogous to FIG. 9, the track cross-section is convex. The track 5 includes a cylindrical surface whose radius of curvature $R_A$ is greater than the rolling radius R of the rolling member 10 and its center is positioned below the central roller plane E. The radius of curvature $R_I$ of the rolling member 10 is also infinite, its center being positioned above the central roller plane, e.g. the roller is tapered downwardly. As a result, there is obtained a tangential plane T forming an angle $\alpha$ of approximately 3° with a reference plane E' which is positioned perpendicularly to the central roller plane E. In consequence, the reaction force of the track 5 acting on the roller 10 includes a radial component acting radially outwardly.

In FIG. 13, analogous to FIG. 10, the radius of curvature $R_A$ of the track 5 in the region of the first contact point C is infinite if viewed in cross-section, but it is positioned below the extended central roller plane E. The track is planar and inclined towards the central roller axis. Seen in cross-section, the roller 10 again comprises a sphere whose radius of curvature $R_I$ is larger than the rolling radius R of the rolling member and whose center is positioned above the central roller plane E. In consequence, there is obtained a tangential plane T forming an angle $\alpha$ of approximately 3° with the reference plane E' which is positioned perpendicularly to the central roller plane E. As a result, the reaction force of the track 5 acting on the roller 10 includes a radial component acting radially outwardly.

Figure 14:
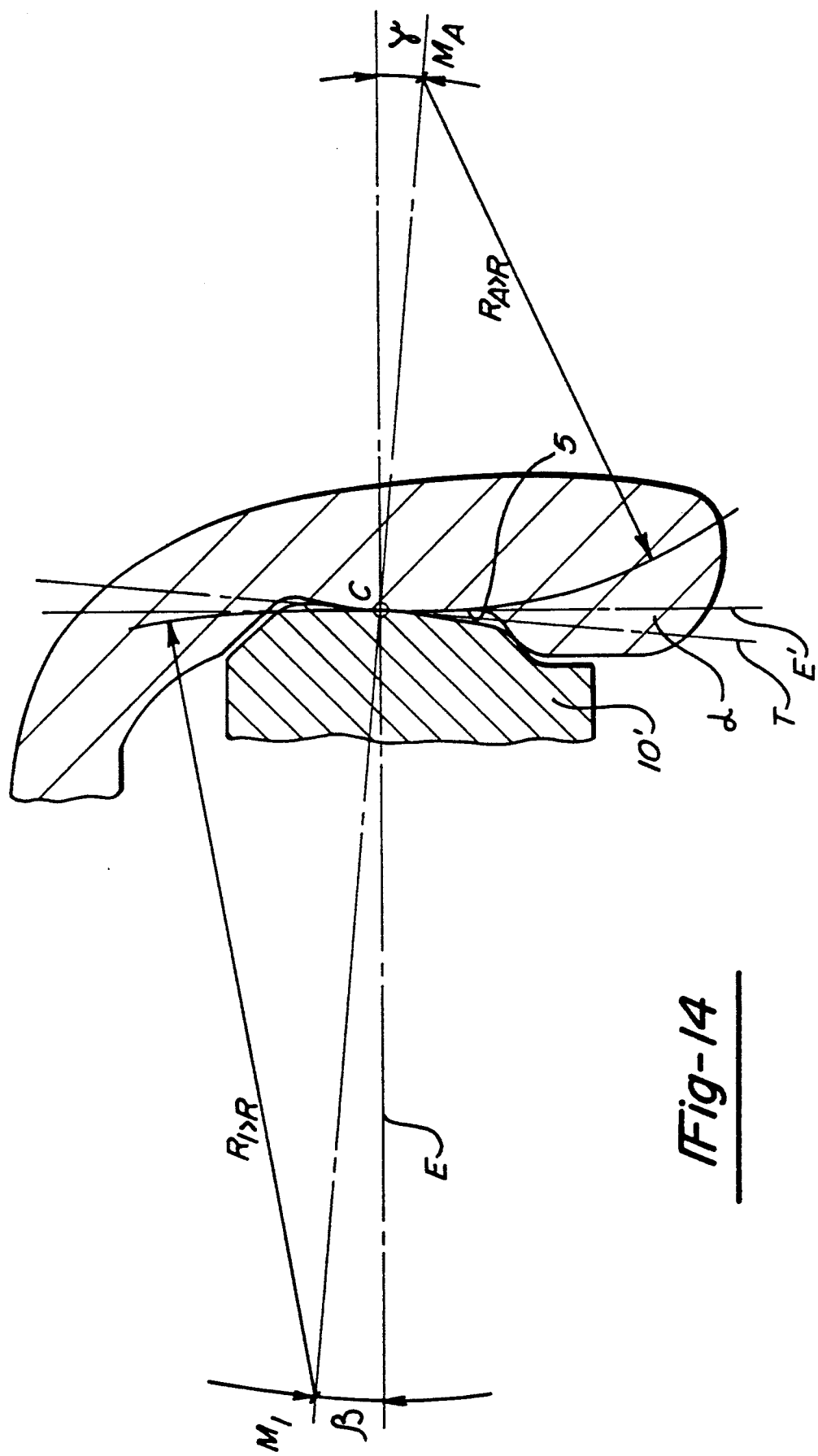
FIG. 14 is a partial section view of a seventh embodiment of a roller in a recess in accordance with the invention.

FIG. 14 shows details regarding the position of the center of curvature $M_A$ of the radius of curvature $R_A$ of track 5 in accordance with FIG. 12 and the position of the center of curvature $M_I$ of the radius of curvature $R_I$ of the roller 10 in accordance with FIG. 13. The angles $\beta$ and $\gamma$ forming the center radii relative to the first contact point C with the plane E are necessarily of the same size. Again, both radii of curvature are greater than the rolling radius of the roller 10. As a result, there is obtained a tangential plane T forming an angle $\alpha$ of approximately 3° with a reference plane E' which is positioned perpendicularly on the central roller plane E. The reaction force of the track 5 acting on the roller 10 thus includes a radial component acting radially outwardly.

While the above detailed description describes the preferred embodiment of the present invention, the invention is susceptible to modification, variation, and alteration without deviating from the scope and fair meaning of the subjoined claims.

We claim:
1. A tripod joint comprising:
   an outer joint part with three circumferentially distributed longitudinal recesses each forming circumferentially opposed tracks;
   an inner joint part with three tripod arms which extend into the longitudinal recesses, respectively;
   a plurality of three rolling members supported by and movably and pivotally held on said tripod arm in rolling contact with said tracks;
   the longitudinal recesses being provided with guiding means for holding and guiding the rolling members in said longitudinal recesses, said guiding means associated with and extending parallel to said longitudinal recesses such that said rolling members are axis-parallel to themselves throughout their rolling contact with said tracks, and said rolling members being in contact with one of said tracks such that there is provided a first contact point with said tracks for accommodating a circumferentially directed transmission force in the region of a central roller plane and at least one second contact point with said guiding means spaced from said first contact point for accommodating an inwardly directed guiding force, said second contact point being on a surface of the associated one of said guiding means and said guiding means surface on an acute or obtuse angle with respect to the arm axis;
   said first contact point being different from said second contact point and with contact existing in both the first and second contact points when said inwardly directed guiding force is exerted from said tripod arms to said rolling members.

2. A tripod joint according to claim 1, wherein said rolling members are in contact with one of the tracks such that there is provided a further third contact point for accommodating a radially outwardly directed guiding force of said guiding means, said third contact point being different from said first and second contact point with contact existing in both the first and third contact points when an outwardly directed force is exerted from said tripod arms to said rolling member.

3. A tripod joint according to claim 2, wherein said rolling members alternately contact with play between the second and third contact points.

4. A joint according to claim 2, wherein said third contact point, with respect to the arm axis, is positioned radially outside the first contact point, and as far as distance and position relative to said first contact point is concerned, said third contact point is arranged approximately symmetrical with the second contact point.

5. A joint according to claim 1, wherein a tangential plane on the roller and track surfaces at said first contact point extends perpendicularly relative to said central roller plane.

6. A tripod joint according to claim 1, wherein a tangential plane on the roller and track surfaces at said first contact point, while opening outwardly, extends at an angle relative to a reference plane which itself extends perpendicularly relative to the central roller plane, thereby causing an outwardly directed reaction force exerted from said tripod arms on the rollers.

7. A joint according to any claim 1, wherein said first contact point is provided between a cylindrical roller surface and a track surface which is convex when viewed in cross section through said joint.

8. A joint according to claim 7, wherein the radius of curvature of the track surface is greater than the roller radius.

9. A joint according to claim 1, wherein said first contact point is provided between a roller surface, which is convex when viewed in a cross section through the joint, and said track surface being planar.

10. A joint according to claim 9, wherein the radius of curvature of the roller surface is greater than the roller radius.

11. A joint according to claim 1, wherein said first contact point is provided between a roller surface, which is convex when viewed in cross section through the joint, and said track surface is convex when viewed in cross section through said joint.

12. A joint according to claim 11, wherein the radius of curvature of the roller surface and/or the radius of curvature of the track surface in cross section through the joint is greater than the roller radius.

13. A joint according to claim 1, wherein said second contact point, with respect to the arm axis, is located radially inside the first contact point and a tangential plane between said two points inclined at an angle of approximately 45° relative to the arm axis.

14. A joint according to claim 1, wherein said rolling member includes a rolling contact bearing supporting said rolling member, said rolling member runs on a roller carrier which is held on said tripod arm so as to be radially movable and pivotable and that said roller carrier includes a cylindrical bore engaged by a spherical arm end of said tripod arm.

15. A joint according to claim 1, wherein said rolling member includes a rolling contact bearing supporting said rolling member, said rolling member runs on a roller carrier which is held on said tripod arm so as to be radially movable and pivotable and that the roller carrier is designed to be in two parts and includes an internally spherical outer ring which is pivotable on an externally spherical inner ring, the latter, with an internally cylindrical bore, being movable on a cylindrical end of said tripod arm.

16. A joint according to claim 1, wherein said rolling member includes an internally cylindrical bore engaged by an externally spherical inner roller which, while being supported by a rolling contact bearing, runs on said tripod arm.

* * * * *